United States Patent
Shin et al.

(10) Patent No.: US 12,269,974 B2
(45) Date of Patent: Apr. 8, 2025

(54) STRUCTURAL ADHESIVE TAPE AND METHOD OF MANUFACTURING THE SAME

(71) Applicants: Hyundai Motor Company, Seoul (KR); Kia Motors Corporation, Seoul (KR); Shinsung Industrial Co., Ltd., Chungcheongbuk-do (KR)

(72) Inventors: Sung Chul Shin, Incheon (KR); Jong Sub Lim, Chungcheongbuk-do (KR)

(73) Assignees: Hyundai Motor Company, Seoul (KR); Kia Corporation, Seoul (KR); Shinsung Industrial Co., Ltd., Chungcheongbuk-do (KR)

( * ) Notice: Subject to any disclaimer, the term of this patent is extended or adjusted under 35 U.S.C. 154(b) by 425 days.

(21) Appl. No.: 17/109,684

(22) Filed: Dec. 2, 2020

(65) Prior Publication Data

US 2022/0033686 A1 Feb. 3, 2022

(30) Foreign Application Priority Data

Jul. 30, 2020 (KR) .......................... 10-2020-0094858

(51) Int. Cl.
*C09J 7/20* (2018.01)
*B32B 15/02* (2006.01)
(Continued)

(52) U.S. Cl.
CPC ................. *C09J 7/20* (2018.01); *B32B 15/02* (2013.01); *B32B 37/00* (2013.01);
(Continued)

(58) Field of Classification Search
None
See application file for complete search history.

(56) References Cited

U.S. PATENT DOCUMENTS 8,535,705 B2 * 9/2013 Pathak .................. A61L 31/148
424/426
8,673,108 B2 * 3/2014 Liang .................... C09J 163/00
156/330

(Continued)

FOREIGN PATENT DOCUMENTS

KR 10-0718811 B1 5/2007
KR 10-2013-0143015 A 12/2013
(Continued)

*Primary Examiner* — Frank D Ducheneaux
(74) *Attorney, Agent, or Firm* — Fox Rothschild LLP

(57) ABSTRACT

Disclosed are a structural adhesive tape in which a mesh layer is located on one side or both sides of an adhesive layer, and a method of manufacturing the same. The mesh layer having a specific specification may be used and an adhesive layer including an epoxy resin with a solid phase and a liquid phase and a flame retardant plasticizer may be used introduced so that a tape sagging phenomenon can be solved while minimizing degradation in adhesive strength. In addition, the mesh layer may be used so that a usage temperature range may be extended from a range ranging from about 5° C. to about 35° C. to a range ranging from about 0° C. to about 40° C., and thus workability in high and low temperature ranges may be improved such that tape workability can be improved even in overseas factories with poor temperature conditions.

9 Claims, 4 Drawing Sheets

(51) Int. Cl.
  *B32B 37/00* (2006.01)
  *B32B 38/00* (2006.01)
  *C08K 3/013* (2018.01)
  *C08K 3/04* (2006.01)
  *C08K 3/36* (2006.01)
  *C08K 5/00* (2006.01)
  *C08K 5/21* (2006.01)
  *C08K 5/315* (2006.01)
  *C08L 75/04* (2006.01)
  *C09J 7/21* (2018.01)
  *C09J 163/00* (2006.01)
  *C08K 3/22* (2006.01)
  *C08K 3/26* (2006.01)
  *C08K 3/30* (2006.01)
  *C08K 3/32* (2006.01)

(52) U.S. Cl.
  CPC .......... *B32B 38/0004* (2013.01); *C08K 3/013* (2018.01); *C08K 3/04* (2013.01); *C08K 3/36* (2013.01); *C08K 5/0016* (2013.01); *C08K 5/0025* (2013.01); *C08K 5/21* (2013.01); *C08K 5/3155* (2013.01); *C08L 75/04* (2013.01); *C09J 7/21* (2018.01); *C09J 163/00* (2013.01); *C08K 2003/2206* (2013.01); *C08K 2003/265* (2013.01); *C08K 2003/3045* (2013.01); *C08K 2003/321* (2013.01); *C09J 2301/122* (2020.08); *C09J 2301/124* (2020.08); *C09J 2301/312* (2020.08); *C09J 2301/408* (2020.08); *C09J 2400/143* (2013.01); *C09J 2400/263* (2013.01); *C09J 2421/00* (2013.01); *C09J 2463/00* (2013.01); *C09J 2467/006* (2013.01); *C09J 2475/00* (2013.01)

(56) References Cited

U.S. PATENT DOCUMENTS

2002/0193474 A1* 12/2002 Daily .................... C09J 133/06
  524/109
2015/0001281 A1* 1/2015 Jialanella ............... C08G 18/10
  228/175
2019/0284738 A1* 9/2019 Fujimura ............... D04H 1/413

FOREIGN PATENT DOCUMENTS

KR           101806739 B1    12/2017
KR       10-2020-0108699 A    9/2020
WO       WO-2013156337 A1 * 10/2013 ........... C09J 163/00

* cited by examiner

STRUCTURAL ADHESIVE TAPE AND METHOD OF MANUFACTURING THE SAME

CROSS-REFERENCE TO RELATED APPLICATION

This application claims under 35 U.S.C. § 119(a) the benefit of priority to Korean Patent Application No. 10-2020-0094858 filed on Jul. 30, 2020, the entire contents of which are incorporated herein by reference.

TECHNICAL FIELD

The present invention relates to a structural adhesive tape and a method of manufacturing the same. The structural adhesive tape may include a mesh layer so it can be applied in a broader temperature range and may prevent a sagging phenomenon while minimizing degradation in adhesive strength,

BACKGROUND

Generally, structural adhesives are applied so as to reinforce rigidity of a vehicle body and improve performance thereof.

In the case of a paste type adhesive among the structural adhesives, there are areas in which application of the paste type adhesive is difficult. For example, there is an insufficient space to install coating equipment, or a portion in which a gap is greater than 1 T and thus a flow problem is concerned when the paste type adhesive is applied.

Therefore, a structural adhesive tape is also applied. The structural adhesive tape is manually attached. The attachment of the structural adhesive tape is performed such that an upper release paper and an adhesive layer are separated from a lower release paper, the structural adhesive tape is attached to an attachment portion, and then the upper release paper is delaminated.

However, in the summer season in which a temperature is high, there is a problem in that a sagging phenomenon of the structural adhesive tape is severe so that it is difficult to attach the structural adhesive tape to a proper position. In the winter season in which the temperature is low, stickiness of the structural adhesive tape is insufficient so that there occurs a case in which the structural adhesive tape is not attached well to a target object. Even when the structural adhesive tape is attached to the target object, there occurs a problem in that the structural adhesive tape is detached from the target object during driving.

When a pressure-sensitive adhesive is additionally applied so as to improve hardness of the adhesive and adhesion with a steel sheet, there occurs a problem of degrading adhesive strength which is original performance of the structural adhesive tape.

Therefore, there is a need for a structural adhesive tape capable of extending a usage temperature range and solving a sagging phenomenon while minimizing degradation in adhesive strength.

SUMMARY

In preferred aspects, provided are a structural adhesive tape including a mesh layer and an adhesive layer including a solid-phase and liquid-phase epoxy resin and a flame retardant plasticizer and located on one side or both sides of the mesh layer, and a method of manufacturing the same.

Objectives of the present invention are not limited to the above-described objectives, and other objectives of the present invention, which are not mentioned, can be understood by the following description and also will be apparently understood through embodiments of the present invention. Further, the objectives of the present invention can be implemented by means described in the appended claims and a combination thereof.

In an aspect, provided is a structural adhesive tape includes a mesh layer, and an adhesive layer located on one side or both sides of the mesh layer. The adhesive layer may include an amount of about 35 to 45 wt % of an epoxy resin, an amount of about 20 to 25 wt % of an inorganic filler, an amount of about 5 to 10 wt % of a moisture scavenger, an amount of about 2 to 5 wt % of a flame retardant plasticizer, an amount of about 10 to 20 wt % of rubber particles, an amount of about 2.5 to 4 wt % of a hardener, and an amount of about 10 to 15 wt % of an urethane resin, based on the total weight of the structural adhesive tape.

The epoxy resin may include an amount of about 25 to 30 wt % in a solid phase and an amount of about 10 to 15 wt % in a liquid phase, based on the total weight of the structural adhesive tape.

The adhesive layer may further include an amount of about 0.05 to 0.1 wt % of a pigment, an amount of about 1 to 2 wt % of a hydrophobic silica, and an amount of about 0.5 to 1 wt % of an urea, based on the total weight of the structural adhesive tape.

The epoxy resin may include one or more selected from the group consisting of a bisphenol A epoxy and a bisphenol F epoxy.

The inorganic filler may include one or more selected from the group consisting of calcium carbonate and barium sulfate.

The moisture scavenger may include calcium oxide.

The flame retardant plasticizer may include tricresyl phosphate.

The rubber particles may include core-shell rubber.

The hardener may include dicyandiamide.

The urethane resin may include one or more selected from the group consisting of hexamethylene diisocyanate (HDI) and methane diisocyanate (MDI).

The pigment may include carbon black.

The mesh layer may include one or more selected from the group consisting of a polyester (PES) fiber, a glass fiber, a polyethylene terephthalate (PET) fiber, and a fabric.

The mesh layer may have a size ranging from about 40 mesh to about 60 mesh, fineness ranging from about 75 D to about 200 D, and a density ranging from about 20 T/inch to about 30 T/inch.

The structural adhesive tape may have shear strength ranging from about 29 MPa to about 35 MPa, delamination strength ranging from about 290 M/25 mm to about 320 M/25 mm, penetration ranging from 10 mm to 12 mm, and sagging ranging from about 1% to about 5%.

In another aspect, provided is a method of manufacturing a structural adhesive tape, which may include manufacturing an adhesive layer by adding an adhesive tape composition to a release paper, manufacturing a laminated body by laminating a mesh layer on the adhesive layer, removing scraps in the mesh layer, and cutting the laminated body from which the scraps have been removed. The adhesive tape composition may include an amount of about 35 to 45 wt % of an epoxy resin, an amount of about 20 to 25 wt % of an inorganic filler, an amount of about 5 to 10 wt % of a moisture scavenger, an amount of about 2 to 5 wt % of a flame retardant plasticizer, an amount of about 10 to 20 wt % of rubber particles, an amount of about 2.5 to 4 wt % of a hardener, and an amount of about 10 to 15 wt % of an urethane resin, based on the total weight of the structural adhesive tape.

The epoxy resin may include an amount of about 25 to 30 wt % in a solid phase and an amount of about 10 to 15 wt % in a liquid phase, based on the total weight of the structural adhesive tape.

The adhesive tape composition may further include an amount of about 0.05 to 0.1 wt % of a pigment, an amount of about 1 to 2 wt % of a hydrophobic silica, and an amount of about 0.5 to 1 wt % of an urea, based on the total weight of the structural adhesive tape.

The epoxy resin may include one or more selected from the group consisting of a bisphenol A epoxy and a bisphenol F epoxy.

The mesh layer may have a size ranging from about 40 mesh to about 60 mesh, fineness ranging from about 75 D to about 200 D, and a density ranging from about 20 T/inch to about 30 T/inch.

The removing of the scraps may be performed using a heating tool to remove the scraps.

Other aspects of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1A:
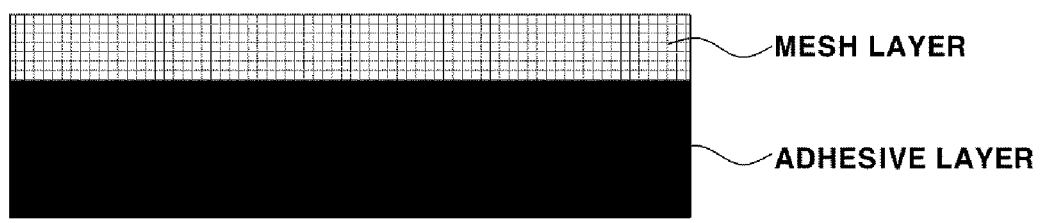
FIG. 1A shows an exemplary structural adhesive tape including a mesh layer and an adhesive layer located on one side of the mesh layer.

It should be understood that the appended drawings are not necessarily to scale, presenting a somewhat simplified representation of various preferred features illustrative of the basic principles of the present invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The above and other objectives, features, and advantages of the present invention will become more apparent from the following description of preferred embodiments with reference to the accompanying drawings. However, the present invention is not limited to the embodiments disclosed herein and may be implemented in other forms. The embodiments disclosed herein will be provided to make this invention thorough and complete, and will fully convey the spirit of the present invention to those skilled in the art.

In describing each drawing, similar reference numerals are assigned similar components. In the accompanying drawings, dimensions of structures are shown in an enlarged scale for clarity of the present disclosure.

In this disclosure, the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof. Further, when a portion of a layer, a film, a region, a plate, or the like is referred to as being "on" other portion, this includes not only a case in which the portion is "directly on" the other portion but also a case in which another portion is present between the portion and the other portion. Contrarily, when a portion of a layer, a film, a region, a plate, or the like is referred to as being "under" other portion, this includes not only a case in which the portion is "directly under" the other portion but also a case in which another portion is present between the portion and the other portion.

Unless otherwise specified, all numbers, values, and/or expressions indicating ingredients, reaction conditions, polymer compositions, and quantities of combination products used herein are approximations to which various uncertainties of measurement are reflected, wherein the various uncertainties occur in obtaining these values among essentially different other things so that it should be understood that all numbers, values, and/or expressions are modified by a term "about." Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when a numerical range is disclosed herein, such a numerical range is continuous and, unless otherwise indicated, the numerical range includes all values from a minimum value to a maximum value. Further, when the numerical range refers to integers, unless otherwise indicated, all integers from a minimum value to a maximum value are included.

In this disclosure, when a range is described for a variable, it will be understood that the variable includes all values within the range including endpoints described in the range. For example, it will be understood that a range from "5 to 10" includes values of 5, 6, 7, 8, 9, and 10 as well as any subranges such as ranges from 6 to 10, from 7 to 10, from 6 to 9, from 7 to 9, and the like, and also includes any values between integers, which are reasonable in the scope of ranges, such as 5.5, 6.5, 7.5, 5.5 to 8.5, and 6.5 to 9, and the like. In addition, for example, it will be understood that a range from "10% to 30%" includes all integers including values 10%, 11%, 12%, 13%, and the like and up to 30% as well as any subranges from 10% to 15%, from 12% to 18%, from 20% to 30%, and the like, and also includes any values between integers, which are reasonable in the scope of ranges, such as 10.5%, 15.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Structural Adhesive Tape

Figure 1B:
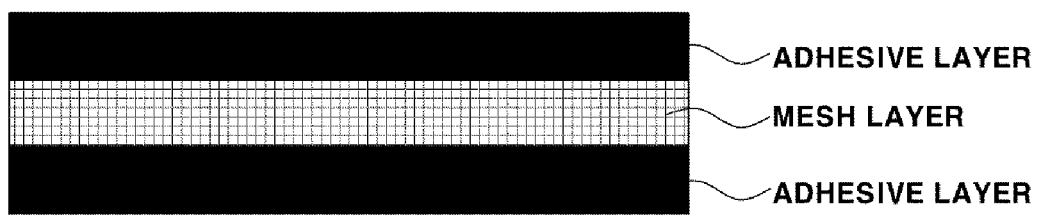
FIG. 1B shows an exemplary structural adhesive tape including a mesh layer and adhesive layers located on both sides of the mesh layer.

FIGS. 1A and 1B are cross-sectional views illustrating an exemplary structural adhesive tape according to an exemplary embodiment of the present invention. For example, FIG. 1A may be a cross section of a structural adhesive tape including a mesh layer and an adhesive layer located on one side of the mesh layer, and FIG. 1B may be a cross section of a structural adhesive tape including a mesh layer and adhesive layers located on both sides of the mesh layer.

Hereinafter, the adhesive layer and the mesh layer included in the structural adhesive tape will be described in detail.

The adhesive layer may include an epoxy resin, an inorganic filler, a moisture scavenger, a flame retardant plasticizer, rubber particles, hardener, and a urethane resin, and preferably, may further include a pigment, hydrophobic silica, and urea. The adhesive layer may suitably include an amount of about 35 to 45 wt % of an epoxy resin, an amount of about 20 to 25 wt % of an inorganic filler, an amount of about 5 to 10 wt % of a moisture scavenger, an amount of about 2 to 5 wt % of a flame retardant plasticizer, an amount of about 10 to 20 wt % of rubber particles, an amount of about 2.5 to 4 wt % of a hardener, and an amount of about 10 to 15 wt % of an urethane resin, based on the total weight of the structural adhesive tape. Preferably, the adhesive layer may minimize degradation in an adhesive strength which may occur due to inclusion of the mesh layer in the structural adhesive tape such that a sagging phenomenon of the structural adhesive tape, which may occur at high temperature, may be solved.

The epoxy resin may be a base resin of the adhesive layer including the epoxy resin and is not particularly limited as long as it can improve shear strength of the structural adhesive tape. The epoxy resin may include one or more selected from the group consisting of bisphenol A epoxy and bisphenol F epoxy, and is not limited to include a specific kind. Preferably, the epoxy resin may be bisphenol A epoxy having excellent reactivity and excellent mechanical strength.

In addition, the epoxy resin may be included in an amount of about 35 to 45 wt % with respect to 100 wt % of the structural adhesive tape. Preferably, in order to reduce hardness of the structural adhesive tape, the epoxy resin may contain a solid phase and a liquid phase together, and more preferably, the epoxy resin may include an amount of about 25 to 30 wt % in a solid phase and 10 to 15 wt % in a liquid phase, based on the total weight of the structural adhesive tape. When the solid phase is contained in the epoxy resin, the hardness of the structural adhesive tape is improved (reduction in penetration). Thus, when the solid phase is less than about 25 wt %, there is a problem in that a sagging phenomenon of the structural adhesive tape may occur at high temperature, and, when the solid phase is greater than about 30 wt %, there is a problem in that adhesiveness may be degraded at low temperature. In addition, when the liquid phase is contained in the epoxy resin, the hardness of the structural adhesive tape may be degraded (improvement in penetration). Thus, when the liquid phase is less than about 10 wt %, adhesiveness may be degraded at low temperature, and, when the liquid phase is greater than about 30 wt %, the sagging phenomenon of the structural adhesive tape may occur at high temperature. That is, since the epoxy resin contains specific contents of the solid phase and the liquid phase, it is possible to prevent the sagging phenomenon of the structural adhesive tape, which may occur due to addition of the mesh layer, such that there is an advantage in that penetration may be improved up to about 10 to 12 mm by softening, and an initial attachable temperature range may be improved in the range of about 0° C. to 40° C.

The inorganic filler is not particularly limited as long as it can impart flowability. The inorganic filler may contain one or more selected from the group consisting of calcium carbonate and barium sulfate and is not limited to containing a specific kind. Preferably, the inorganic filler may be calcium carbonate having the lowest production cost. In addition, the inorganic filler may be included in an amount of about 20 to 25 wt % with respect to 100 wt % of the structural adhesive tape. When a content of the inorganic filler is less than about 20 wt %, viscosity may be increased and thus workability may be degraded. When the content of the inorganic filler is greater than about 25 wt %, adhesive strength may be decreased.

The moisture scavenger is not particularly limited as long as, when moisture infiltrates into the structural adhesive tape, it can generate heat to dry the moisture. The moisture scavenger is not limited to include a specific kind. Preferably, the moisture scavenger may be calcium oxide which does not react with other adhesive components and reacts with only moisture. In addition, the moisture scavenger may be included in an amount of about 5 to 10 wt % with respect to 100 wt % of the structural adhesive tape. When a content of the moisture scavenger is less than about 5 wt %, a physical property thereof may be degraded in a high humidity atmosphere, and, when the content of the moisture scavenger is greater than about 10 wt %, shear strength may be degraded.

The flame retardant plasticizer is not particularly limited as long as it can complement thermal deformation of the epoxy resin, which is the base resin, and impart flexibility thereto during curing. The flame retardant plasticizer is not limited to include a specific kind. Preferably, the flame retardant plasticizer may be tricresyl phosphate. In addition, the flame retardant plasticizer may be included in an amount of about 2 to 5 wt % with respect to 100 wt % of the structural adhesive tape. When a content of the flame retardant plasticizer is less than about 2 wt %, effects of thermal deformation attenuation and flexibility impartment of the epoxy resin may be insufficient, and, when the content of the flame retardant plasticizer is greater than about 5 wt %, shear strength, T-shaped delamination strength, and impact strength may be degraded.

The rubber particles are not particularly limited as long as they can attenuate brittleness of the epoxy resin which is the base resin. The rubber particles may be core-shell rubber, and preferably, core-shell rubber capable of improving impact resistance, and more preferably, particles in which NBR and acrylic are coated on calcium carbonate. In addition, the rubber particles may be included in an amount of about 10 to 20 wt % with respect to 100 wt % of the structural adhesive tape. When a content of the rubber particles is less than about 10 wt %, a function of preventing cracks of the epoxy resin against an impact may be degraded, and, when the content of the rubber particles is greater than about 20 wt %, a content of rubber may be increased and thus the shear strength is degraded.

The hardener is not particularly limited as long as it can cure the epoxy resin, which is the base resin, and impart adhesive strength with a steel sheet. The hardener is not limited to include a specific kind. Preferably, the hardener may be dicyandiamide capable of being thermally cured and achieving strong adhesive strength. In addition, the hardener may be included in an amount of about 2.5 to 4 wt % with respect to 100 wt % of the structural adhesive tape. When a content of the hardener is less than about 2.5 wt %, the shear strength, the T-shaped delamination strength, and the impact strength may be degraded, and, when the content of the hardener is greater than about 4 wt %, carbonization may occur in an over-baking condition.

The urethane resin is not particularly limited as long as it can impart flexibility to the epoxy resin which is the base resin. The urethane resin is not limited to specific kinds. Preferably, the urethane resin may include hexamethylene diisocyanate (HDI) and methane diisocyanate (MDI) which are capable of improving impact resistance. In addition, the urethane resin may be included in an amount of about 10 to 15 wt % with respect to 100 wt % of the structural adhesive tape. When a content of the urethane resin is less than about 10 wt % or is greater than about 15 wt %, the shear strength, the T-shaped delamination strength, and the impact strength are degraded.

The pigment is not particularly limited as long as it can impart a black color to the structural adhesive tape containing the pigment. The pigment is not limited to specific kinds. Preferably, the pigment may be carbon black capable of exhibiting a black color. In addition, the pigment may be included in an amount of about 0.05 to 0.1 wt % with respect to 100 wt % of the structural adhesive tape. When a content of the pigment is less than about 0.05 wt %, a degree of blackness may be decreased, and, when the content of the pigment is greater than about 0.1 wt %, there is a disadvantage in that a price rises.

The hydrophobic silica is not particularly limited as long as it can enhance a bonding force between organic-inorganic materials contained in the structural adhesive tape. In addition, the hydrophobic silica may be included in an amount of about 1 to 2 wt % with respect to 100 wt % of the structural adhesive tape. When a content of the hydrophobic silica is less than about 1 wt %, adhesive strength may be degraded, and, when the content of the hydrophobic silica is greater than about 2 wt %, since the hydrophobic silica is an expensive material, there is a disadvantage in that a price rises.

The urea is not particularly limited as long as it can shorten a curing time of the epoxy resin which is the base resin. In addition, the urea may be included in an amount of about 0.5 to 1 wt % with respect to 100 wt % of the structural adhesive tape. When a content of the urea is less than about 0.5 wt %, curing may not proceed sufficiently, and, when the content of the urea is greater than about 1 wt %, over-baking may occur.

The mesh layer is not particularly limited as long as it can simultaneously improve attachment workability of the structural adhesive tape including the mesh layer at both high and low temperatures. The mesh layer may include one or more selected from the group consisting of a polyester (PES) fiber, a glass fiber, a polyethylene terephthalate (PET) fiber, and a fabric and is not limited to specific kinds. Preferably, the mesh layer may include the PES fiber having the lowest degradation rate in adhesion strength of an adhesive.

In order to solve the sagging phenomenon at high and low temperatures while minimizing degradation in adhesive strength of the structural adhesive tape including the mesh layer, the mesh layer may have a size ranging from about 40 Mesh to about 60 Mesh, fineness ranging from about 75 D to about 200 D, and a density ranging from about 20 T/inch to about 30 T/inch. When the size is less than about 40 Mesh, an effect of improving the sagging of the structural adhesive tape may be insignificant, and, when the size is greater than about 60 Mesh, the shear strength is degraded. In addition, when the fineness is less than about 75 D, the effect of improving the sagging of the structural adhesive tape is insignificant, and, when the fineness is greater than about 200 D, the shear strength may be degraded. In addition, when the density is less than about 20 T/inch, the effect of improving the sagging of the structural adhesive tape may be insignificant, and, when the density is greater than about 30 T/inch, the shear strength may be degraded.

That is, since the mesh layer is included in the structural adhesive tape, it is possible to solve the sagging phenomenon at high and low temperatures while minimizing degradation in adhesive strength of the structural adhesive tape including the mesh layer. Accordingly, penetration of the existing structural tape may be at a level of about 4 mm to 7 mm, and, when the penetration is less than about 4 mm, adhesion at low temperature (5° C. or less) may become weak, and, when the penetration is greater than about 7 mm, the existing structural tape may be difficult to be separated from the release paper due to a sagging phenomenon of the existing structural tape at high temperature (35° C. or greater). However, the structural adhesive tape may include the mesh layer and thus a sagging phenomenon may be prevented, and even when penetration is softened in the range of about 10 mm to 12 mm by changing a component and a composition of the adhesive layer, the sagging phenomenon does not occur at high temperature so that there is an advantage in that an initial attachable temperature range may be improved to a temperature ranging from about 0° C. to 40° C.

The structural adhesive tape including the adhesive layer and the mesh layer may have shear strength ranging from about 29 MPa to about 35 MPa, delamination strength ranging from about 290 M/25 mm to about 320 M/25 mm, penetration ranging from about 10 mm to about 12 mm, and sagging ranging from about 1% to about 5%. Accordingly, the structural adhesive tape may provide an effect of solving the sagging phenomenon of the structural adhesive tape while minimizing degradation in adhesive strength. In addition, a usage temperature range is extended from a range ranging from about 5° C. to about 35° C. to a range ranging from about 0° C. to about 40° C., and thus workability in high and low temperature ranges may be substantially improved such that there is an effect of improving tape workability even in overseas factories with poor temperature conditions.

Method of Manufacturing Structural Adhesive Tape

Figure 2:
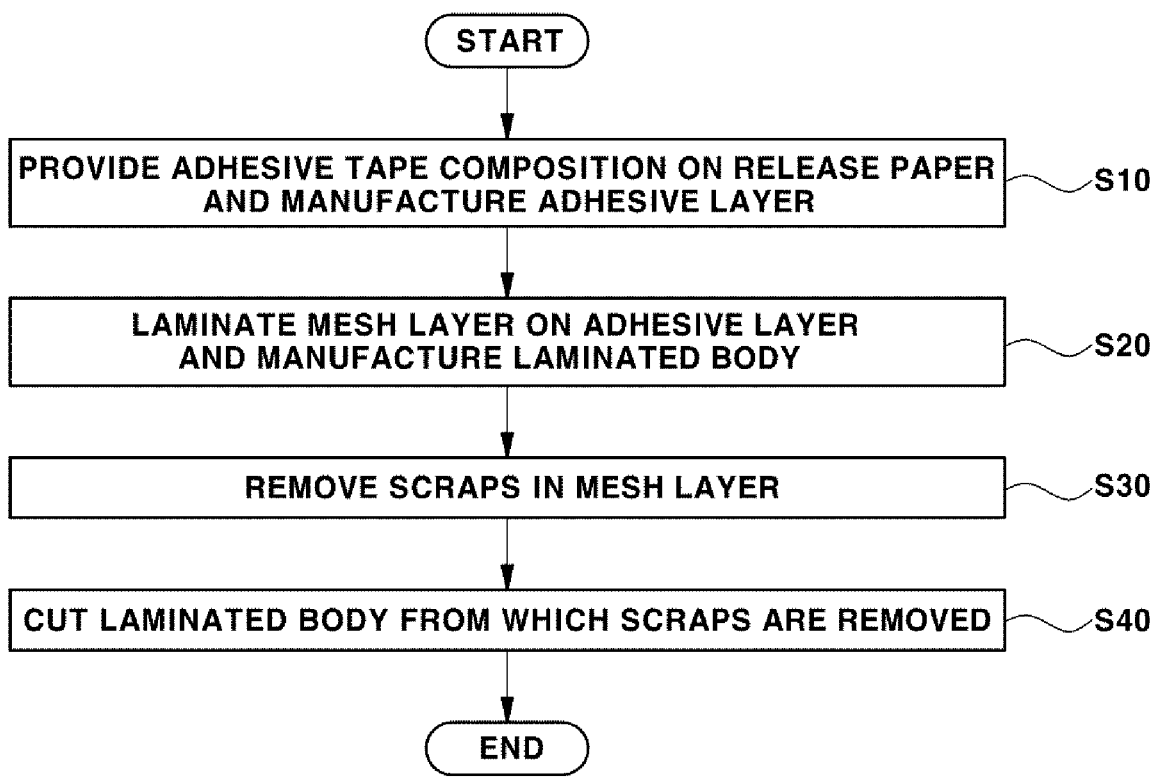
FIG. 2 shows an exemplary method of manufacturing a structural adhesive tape according to an exemplary embodiment of the present invention.
Figure 3:
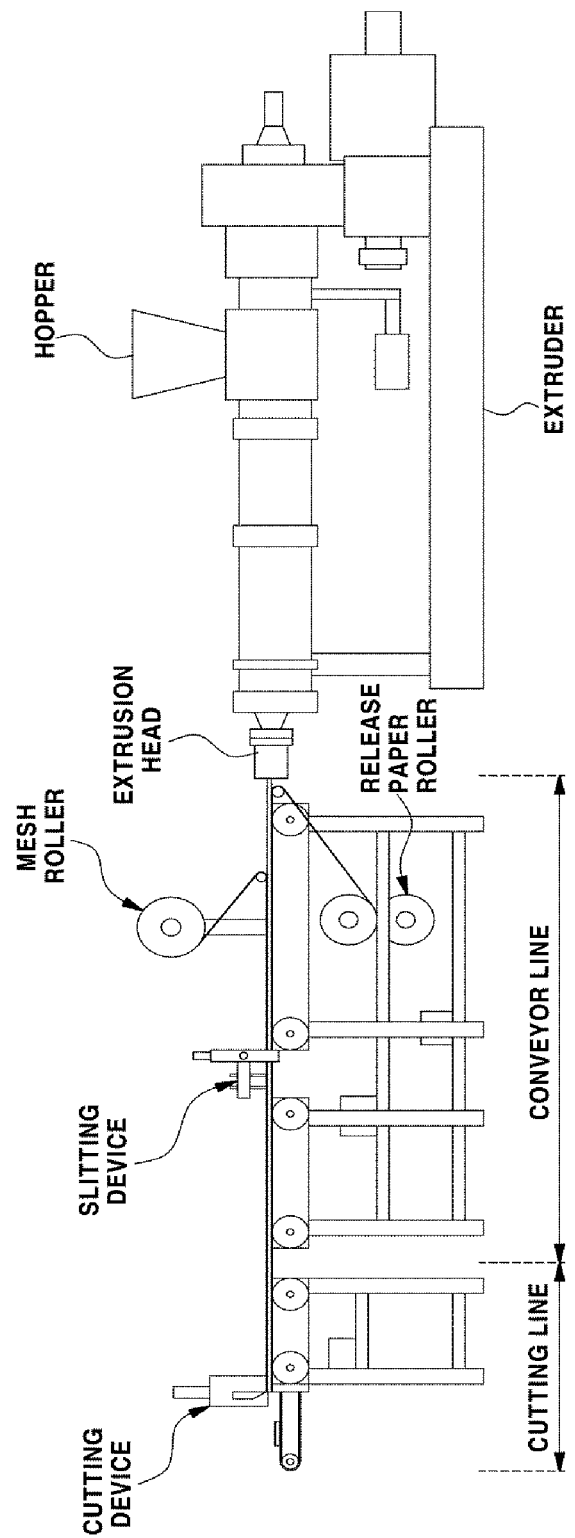
FIG. 3 shows an exemplary automated process of manufacturing an exemplary structural adhesive tape according to an exemplary embodiment of the present invention.

FIG. 2 shows an exemplary method of manufacturing an exemplary structural adhesive tape according to an exemplary embodiment of the present invention. As shown in FIG. 2, the method of manufacturing a structural adhesive tape may include providing an adhesive tape composition to a release paper and manufacturing an adhesive layer (S10), laminating a mesh layer on the adhesive layer to manufacture a laminated body (S20), removing scraps in the mesh layer (S30), and cutting the laminated body from which the scraps are removed (S40). Meanwhile, FIG. 3 is a diagram illustrating an automated process of manufacturing the structural adhesive tape. FIG. 3 shows the method of manufacturing a structural adhesive tape in detail.

The manufacturing of the adhesive layer (S10) is an operation of providing the adhesive tape composition to the release paper and manufacturing the adhesive layer. As shown in FIG. 3, the release paper may be provided by being unwound from a release paper roller located below a conveyor line, and the adhesive tape composition injected into a hopper in an extruder may be discharged to the release paper provided from the release paper roller through an extrusion head located in front of the extruder. Consequently, the adhesive tape composition may be provided on the release paper through the extruder so that the adhesive layer may be manufactured. The adhesive tape composition may be the same as or may be different from a component included in the adhesive layer in the structural adhesive tape.

The manufacturing of the laminated body (S20) is an operation of laminating the mesh layer on the adhesive layer manufactured on the release paper to manufacture the laminated body. The mesh layer may be laminated on the adhesive layer located on the release paper transferred to a cutting line while being unwound from a mesh roller located above a conveyor line.

Figure 4:
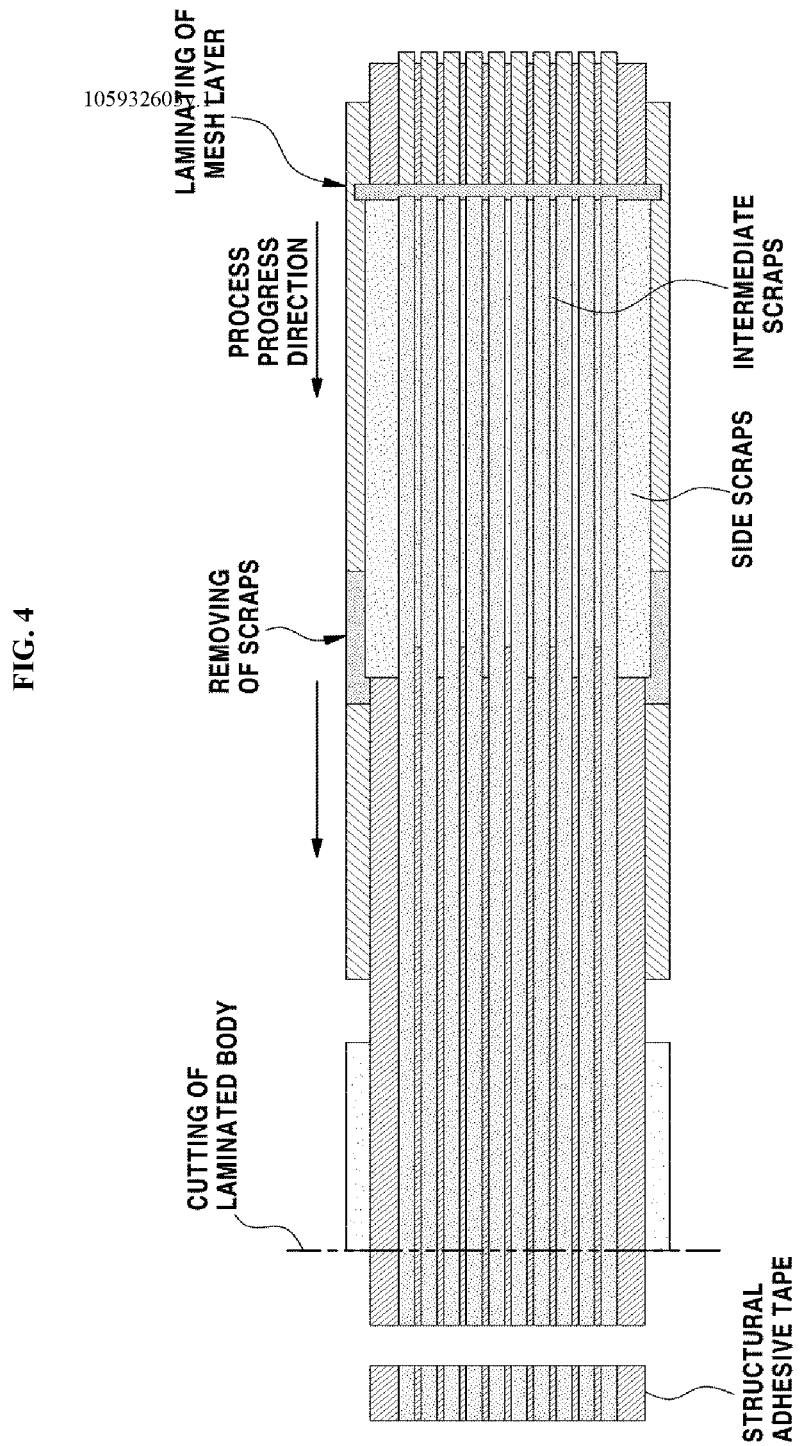
FIG. 4 shows an exemplary process in which scraps in the mesh layer are removed through a slitting device while a laminated body in which a mesh layer is laminated is transferred to a cutting line on a conveyor line according to an exemplary embodiment of the present invention.

The removing of the scraps (S30) is an operation of removing unnecessary scraps in the mesh layer. In the laminated body in which the mesh layer is laminated while being transferred to the cutting line on the conveyor line, the scraps on the mesh layer may be removed through a slitting device located on the conveyor line. FIG. 4 is a detailed plan view illustrating a process in which the scraps in the mesh layer are removed through the slitting device while the laminated body in which the mesh layer is laminated is transferred to a cutting line on the conveyor line. The laminated body in which the mesh layer is laminated through the mesh roller may be transferred on the conveyor line in a direction of the cutting line, and, during the transfer, side scraps and intermediate scraps may be removed using a heating tool in the slitting device located on the conveyor line. The side scraps may be removed through the slitting device and then separately removed through a rewinder device (not shown). The heating tool may be introduced to complement a difficulty in maintaining an appearance which may occur when the laminated body is cut using a general physical method. Since a heat source raising a temperature above a melting point of the component included in the mesh layer may be applied to the heating tool, the heating tool may provide an advantage of melting and vaporizing the scraps in the mesh layer to remove only the scraps while maintaining the appearance of the mesh layer.

The cutting of the laminated body (S40) is an operation of cutting the laminated body from which the scraps are removed. The laminated body from which the scraps are removed may be transferred from the conveyor line to the cutting line. Then, the laminated body transferred to the cutting line may cut through a cutting device to manufacture a structural adhesive tape suitable for a size which is desired by a user.

EXAMPLE

Hereinafter, the present invention will be described in more detail through a specific example. The following example is merely illustrative to aid understanding of the present invention, and the scope of the present invention is not limited by the following example.

Example—Structural Adhesive Tape Manufactured by the Method of Manufacturing Structural Adhesive Tape According to the Present Invention As shown in FIG. 3, the structural adhesive tape was manufactured through an automated process of manufacturing the structural adhesive tape according to an exemplary embodiment of the present invention. A specific manufacturing process is as follows.

(S10) The adhesive tape composition was put into the hopper in the extruder. The adhesive tape composition included 27.5 wt % bisphenol A epoxy in a solid phase and 12.5 wt % bisphenol A epoxy in a liquid phase as an epoxy resin, 22.5 wt % calcium carbonate as an inorganic filler, 7.5 wt % calcium oxide as a moisture scavenger, 3.5 wt % tricresyl phosphate as a flame retardant plasticizer, 15 wt % core-shell rubber as rubber particles, 3.5 wt % dicyandiamide as a hardener, 12.5 wt % MDI as a urethane resin, 0.1 wt % carbon black as a pigment, 1.5 wt % hydrophobic silica, and 1.0 wt % urea, based on the total weight of the structural adhesive tape. In this case, the put adhesive tape composition was discharged to the release paper, which was provided while being unwound from the release paper roller through the extrusion head located in the extruder, and laminated on the release paper to manufacture the adhesive layer.

(S20) The mesh layer may be laminated on the adhesive layer located on the release paper transferred to the cutting line while being unwound from the mesh roller located above the conveyor line to manufacture the laminated body. In this case, the mesh layer included the PES fiber and had a size of 50 Mesh, fineness of 150 D, and a density of 25 T/inch.

(S30 and S40) The laminated body in which the mesh layer was laminated through the mesh roller was transferred on the conveyor line in a direction of the cutting line, and, during the transfer, side scraps and intermediate scraps were removed using the heating tool in the slitting device located on the conveyor line. Thereafter, the laminated body transferred to the cutting line was cut through the cutting device so that the structural adhesive tape was finally manufactured.

Comparative Examples 1 to 6: Structural Adhesive Tape in which Size, Fineness, and Density of Mesh Layer are Varied When compared with Example, structural adhesive tapes were manufactured in the same manner as in Example, except for Comparative Example 1 in which the mesh layer had a size of 35 Mesh, fineness of 150 D, and a density of 25 T/inch, Comparative Example 2 in which the mesh layer had a size of 65 Mesh, fineness of 150 D, and a density of 25 T/inch, Comparative Example 3 in which the mesh layer had a size of 50 Mesh, fineness of 50 D, and a density of 25 T/inch, Comparative Example 4 in which the mesh layer had a size of 50 Mesh, fineness of 250 D, and a density of 25 T/inch, Comparative Example 5 in which the mesh layer had a size of 50 Mesh, fineness of 150 D, and a density of 15 T/inch, and Comparative Example 6 in which the mesh layer had a size of 50 Mesh, fineness of 51 D, and a density of 35 T/inch.

Comparative Examples 7-1 to 10-2: Structural Adhesive Tape in which Kinds of Components in Mesh Layer, Kinds of Components in Adhesive Layer, and Laminated Structure are Varied When compared with Example, structural adhesive tapes were manufactured in the same manner as in Example, except for Comparative Example 7-1 in which components in the adhesive layer were different by adding 12.5 wt % bisphenol A epoxy resin in a liquid phase and 3.5 wt % tricresyl phosphate, and Comparative Example 7-2 in which the mesh layer was laminated on both sides.

In addition, when compared with Comparative Example 7-1, structural adhesive tapes were manufactured in the same manner as in Comparative Example 7-1, except for Comparative Example 8-1 in which the mesh layer included a glass fiber instead of the PES fiber, and Comparative Example 8-2 in which the mesh layer was laminated on both sides.

In addition, when compared with Comparative Example 7-1, structural adhesive tapes were manufactured in the same manner as in Comparative Example 7-1, except for Comparative Example 9-1 in which the mesh layer included the PET fiber instead of the PES fiber, and Comparative Example 9-2 in which the mesh layer was laminated on both sides.

In addition, when compared with Comparative Example 7-1, structural adhesive tapes were manufactured in the same manner as in Comparative Example 7-1, except for Comparative Example 10-1 in which the mesh layer included a fabric instead of the PES fiber, and Comparative Example 10-2 in which the mesh layer was laminated on both sides.

Experimental Example 1: Comparison of Physical Property of Structural Adhesive Tape According to Kinds of Components in Mesh Layer and Variation in Laminated Structure The structural adhesive tapes were manufactured according to Comparative Examples 7-1 to 10-2 of the present invention, and specifications of the mesh layers according to the components contained in the structural adhesive tapes and structural adhesive tape specifications were measured, and results were shown in Table 1 below.

included the mesh layers containing the glass fibers, were relatively large as 1 T so that the structural adhesive tapes are disadvantageous for adhesion and may be difficult to be applied to thin film matching which is less than 1 T. In addition, Comparative Examples 9-1 and 9-2, in which the structural adhesive tapes included the mesh layers containing the PET fibers, had a good level to be used as mesh layer materials, but had an amount of degradation in adhesive strength that was relatively greater than those of Comparative Examples 7-1 and 7-2. Lastly, each of Comparative Examples 10-1 and 10-2, in which the structural adhesive tapes included the mesh layers containing the fabrics, have a melting point of 150° C., and thus the temperature was less than a standard curing temperature of an adhesive so that it may be difficult for the mesh layers to serve as a mesh layer. That is, Comparative Examples 7-1 and 7-2, in which the structural adhesive tapes included the mesh layers containing the PES fibers, had excellent shear strength and excellent delamination strength, which are main physical properties, and had the lowest degradation in adhesive strength so that it is most suitable for the mesh layer to include the PES fiber. In addition, in a lamination method, even when the mesh layer was laminated on both sides or one side of the adhesive layer, the adhesive strengths were similar to each other and thus Comparative Example 7-1 having a single-sided laminated structure, which is more advantageous for the automated process, was most suitable.

However, there was a problem of degrading the adhesive strength when the mesh layer was applied. In the structural adhesive tape to which the adhesive layer was applied, the degradation in adhesive strength was complemented to extend the usage temperature range from a range ranging from 5° C. to 35° C. to a range ranging from 0° C. to 40° C.

TABLE 1

| | | | Evaluation results | | | | | |
|---|---|---|---|---|---|---|---|---|
| | Kinds of | | mesh layer SPEC | | | | Structural adhesive tape specification (MS715-60 SPEC) | |
| Items | components in mesh layer | Lamination method | Specific gravity | Thickness (mm) | Melting point (° C.) | Tensile strength (MPa) | Shear strength (MPa) | Delamination strength (N/25 mm) |
| | Requirements | | — | — | — | — | 25 or more | 100 or more |
| | Existing product | | — | — | — | — | 33 | 350 |
| Comparative Example 7-1 | Polyester (PES) fiber | Cross section | 1.38 | 0.13 | 255 | 390 | 22 | 294 |
| Comparative Example 7-2 | | Both sides | | | | | 23 | 311 |
| Comparative Example 8-1 | Glass fiber | Cross section | 2.54 | 1.0 | 840 | 3448 | 15 | 150 |
| Comparative Example 8-2 | | Both sides | | | | | 17 | 162 |
| Comparative Example 9-1 | Polyethylene terephthalate (PET) fiber | Cross section | 1.39 | 0.5 | 260 | 90 | 19 | 190 |
| Comparative Example 9-2 | | Both sides | | | | | 20 | 199 |
| Comparative Example 10-1 | Fabric | Cross section | 1.54 | 0.4 | 150 | 390~600 | 20 | 170 |
| Comparative Example 10-2 | | Both sides | | | | | 20 | 185 |

As shown in Table 1, Comparative Examples 7-1 and 7-2, in which the structural adhesive tapes included the mesh layers containing the PES fibers, had lowest degradation in adhesive strength as compared with Comparative Examples 8-1 to 10-2. Meanwhile, thicknesses of Comparative Examples 8-1 and 8-2, in which the structural adhesive tapes and thus improved workability in the high/low temperature ranges. Consequently, there is an effect of improving tape workability even in overseas factories with poor temperature conditions and also an effect of solving a tape sagging phenomenon while minimizing degradation in adhesive strength.

Average physical property evaluation results of the structural adhesive tape according to the embodiment of the present invention are shown in Table 2 below.

TABLE 2

| Experimental Items | | Requirements (MS715-60 TYPE B) | Evaluation results Shinsung Industry (Product Name: SSI-4010M) |
|---|---|---|---|
| Shear adhesive strength | Standard | 25 MPa or more | 29.1 |
| Delamination strength | | 100 N/25 mm or more | 291 |
| Initial adhesiveness | Summer season | Degree of sagging at 40° C. | 2% |
| | Winter season | 0° C. or less (established 5° C. or less) | 0 |

Experimental Example 2: Comparison of Physical Properties of Structural Adhesive Tapes According to Specifications in Mesh Layer The structural adhesive tapes were manufactured according to Example and Comparative Examples 1 to 6 of the present invention, and specifications of the mesh layers according to the components contained in the structural adhesive tapes and structural adhesive tape specifications were measured, and results were shown in Table 3 below.

TABLE 3

| Items | Size (mesh) | Fineness (D) | Density (T/inch) | Shear strength | Sagging |
|---|---|---|---|---|---|
| Requirements | — | — | — | 25 or more | 5% or less |
| Comparative Example 1 | 35 | 150 | 25 | 35 | 10% |
| Example | 50 | 150 | 25 | 33 | 2% |
| Comparative Example 2 | 65 | 150 | 25 | 23 | 1% |
| Comparative Example 3 | 50 | 50 | 25 | 34 | 13% |
| Comparative Example 4 | 50 | 250 | 25 | 22 | 2% |
| Comparative Example 5 | 50 | 150 | 15 | 34 | 12% |
| Comparative Example 6 | 50 | 51 | 35 | 22 | 1% |
| Existing product (no mesh) | — | — | — | 28 | 180% |

As shown in Table 3, when the size of the mesh layer was less than 40 mesh as in Comparative Example 1, there was an improvement in sagging, but the size of the mesh layer exceeded a target requirement of 5%. When the size of the mesh layer was greater than 60 mesh as in Comparative Example 2, the shear strength failed to reach the target requirement. In addition, when the fineness was less than 75 D as in Comparative Example 3, there was an improvement in sagging, but the fineness exceeded the target requirement of 5%. When the fineness is greater than 200 D as in Comparative Example 4, the shear strength failed to reach the target requirement. In addition, when the density was less than 20 T/inch as in Comparative Example 5, there was an improvement in sagging, but the density exceeded the target requirement of 5%. When the density was greater than 30 T/inch as in Comparative Example 6, the shear strength failed to reach the target requirement. Therefore, the structural adhesive tape manufactured using the mesh layer which satisfies the size ranging from 40 mesh to 60 mesh, the fineness ranging from 75 D to 200 D, and the density ranging from 20 T/inch to 30 T/inch according to the present invention extends the usage temperature range from a range ranging from 5° C. to 35° C. to a range ranging from 0° C. to 40° C. to improve workability in the high/low temperature ranges. Consequently, there is an effect of improving tape workability even in overseas factories with poor temperature conditions and also an effect of solving a tape sagging phenomenon while minimizing degradation in adhesive strength.

The present invention relates to a structural adhesive tape in which a mesh layer is located on one side or both sides of an adhesive layer, and a method of manufacturing the same. According to various exemplary embodiments of the present invention, the structural adhesive tape may include a mesh layer having a specific specification and an adhesive layer containing an epoxy resin with a solid phase and a liquid phase and a flame retardant plasticizer in specific contents so that there is an effect of solving a tape sagging phenomenon while minimizing degradation in adhesive strength. In addition, in accordance with the structural adhesive tape according to various exemplary embodiments of the present invention, the mesh layer may be used so that a usage temperature range is extended from a range ranging from about 5° C. to about 35° C. to a range ranging from about 0° C. to about 40° C., and thus workability in high and low temperature ranges may be improved such that there is an effect of improving tape workability even in overseas factories with poor temperature conditions.

The effects of the present invention are not limited to the above-described effects. It should be understood that the effects of the present invention include all effects which can be inferred from the above description.

The foregoing detailed description illustrates the present invention. Further, the foregoing is intended to illustrate and describe the exemplary embodiments of the present invention, and the present invention may be used in various other combinations, modifications, and environments. That is, it is possible to practice alternations or modifications without departing from the scope of the present invention disclosed in this specification, equivalents, and/or within the technical or knowledge scope in the art to which the present invention pertains. The described embodiments are intended to illustrate the best mode for carrying out the technical spirit of the present invention and various modification can made in the specific applications and uses of the present invention. Therefore, the detailed description is not intended to limit the present invention as in the disclosed embodiments. Further, it should be construed that the appended claims are intended to include another embodiment.

What is claimed is:

1. A structural adhesive tape, comprising:
a mesh layer; and
an adhesive layer located on one side or both sides of the mesh layer,
wherein the adhesive layer comprises an amount of 35 to 45 wt % of an epoxy resin, an amount of 20 to 25 wt % of an inorganic filler, an amount of 5 to 10 wt % of a moisture scavenger, an amount of 2 to 5 wt % of a flame retardant plasticizer, an amount of 10 to 20 wt % of rubber particles, an amount of 2.5 to 4 wt % of a hardener, and an amount of 10 to 15 wt % of a urethane resin based on the total weight of the adhesive layer, the epoxy resin comprising an amount of 25 to 30 wt % in a solid phase and an amount of 10 to 15 wt % in a liquid phase, based on the total weight of the adhesive layer, wherein the adhesive layer further comprises an amount of 0.05 to 0.1 wt % of a pigment, an amount of 1 to 2 wt % of a hydrophobic silica, and an amount of 0.5 to 1 wt % of a urea, based on the total weight of the adhesive layer, and wherein the mesh layer comprises a polyester fiber, wherein the mesh layer has a size ranging from 40 mesh to 60 mesh, fineness ranging from 75 D to 200 D, and a density ranging from 20 T/inch to 30 T/inch, wherein the inorganic filler comprises one or more selected from the group consisting of calcium carbonate and barium sulfate, wherein the moisture scavenger comprises calcium oxide, wherein the flame retardant plasticizer comprises tricresyl phosphate, wherein the structural adhesive tape has shear strength ranges from 29 MPa to 35 MPa, delamination strength ranges from 290 N/25 mm to 320 N/25 mm.

2. The structural adhesive tape of claim 1, wherein the epoxy resin comprises one or more selected from the group consisting of a bisphenol A epoxy and a bisphenol F epoxy.

3. The structural adhesive tape of claim 1, wherein the rubber particles comprise core-shell rubber.

4. The structural adhesive tape of claim 1, wherein the hardener comprises dicyandiamide.

5. The structural adhesive tape of claim 1, wherein the urethane resin comprises one or more selected from the group consisting of hexamethylene diisocyanate (HDI) and methylene diphenyl diisocyanate (MDI).

6. The structural adhesive tape of claim 1, wherein the pigment comprises carbon black.

7. A method of manufacturing a structural adhesive tape, comprising:
manufacturing an adhesive layer by adding an adhesive tape composition to a release paper;
manufacturing a laminated body by laminating a mesh layer on the adhesive layer;
removing scraps in the mesh layer; and
cutting the laminated body from which the scraps have been removed, wherein the adhesive tape composition comprises an amount of 35 to 45 wt % of an epoxy resin, an amount of 20 to 25 wt % of an inorganic filler, an amount of 5 to 10 wt % of a moisture scavenger, an amount of 2 to 5 wt % of a flame retardant plasticizer, an amount of 10 to 20 wt % of rubber particles, an amount of 2.5 to 4 wt % of a hardener, and an amount of 10 to 15 wt % of an urethane resin, the epoxy resin comprises an amount of 25 to 30 wt % in a solid phase and an amount of 10 to 15 wt % in a liquid phase, all the wt % are based on the total weight of the adhesive layer, wherein the adhesive layer further comprises an amount of 0.05 to 0.1 wt % of a pigment, an amount of 1 to 2 wt % of a hydrophobic silica, and an amount of 0.5 to 1 wt % of an urea, based on the total weight of the adhesive layer, wherein the mesh layer comprises a polyester fiber, wherein the mesh layer has a size ranging from 40 mesh to 60 mesh, fineness ranging from 75 D to 200 D, and a density ranging from 20 T/inch to 30 T/inch, wherein the inorganic filler comprises one or more selected from the group consisting of calcium carbonate and barium sulfate, wherein the moisture scavenger comprises calcium oxide, wherein the flame retardant plasticizer comprises tricresyl phosphate, and wherein the structural adhesive tape has shear strength ranges from 29 MPa to 35 MPa, delamination strength ranges from 290 M/25 mm to 320 M/25 mm.

8. The method of claim 7, wherein the epoxy resin includes one or more selected from the group consisting of a bisphenol A epoxy and a bisphenol F epoxy.

9. The method of claim 7, wherein the removing of the scraps is performed using a heating tool.

* * * * *